(No Model.)
G. J. RECORD.
REMOVABLE HINGE AND COVER FOR SAP PAILS.
No. 417,281. Patented Dec. 17, 1889.
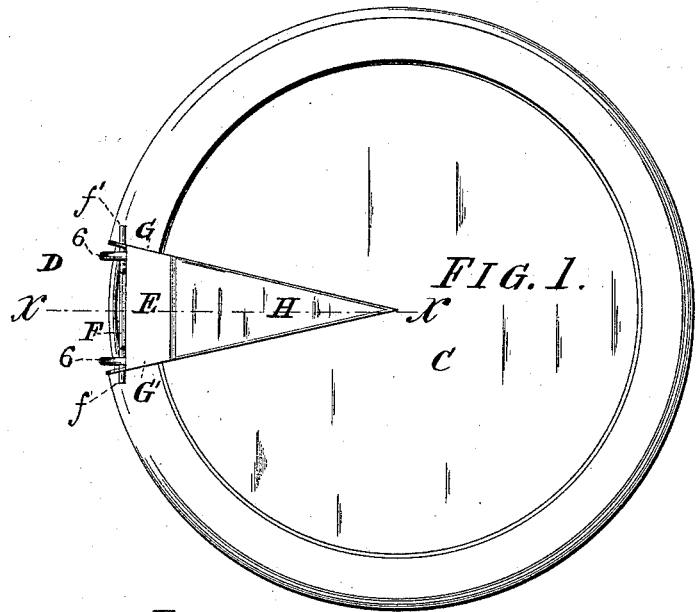
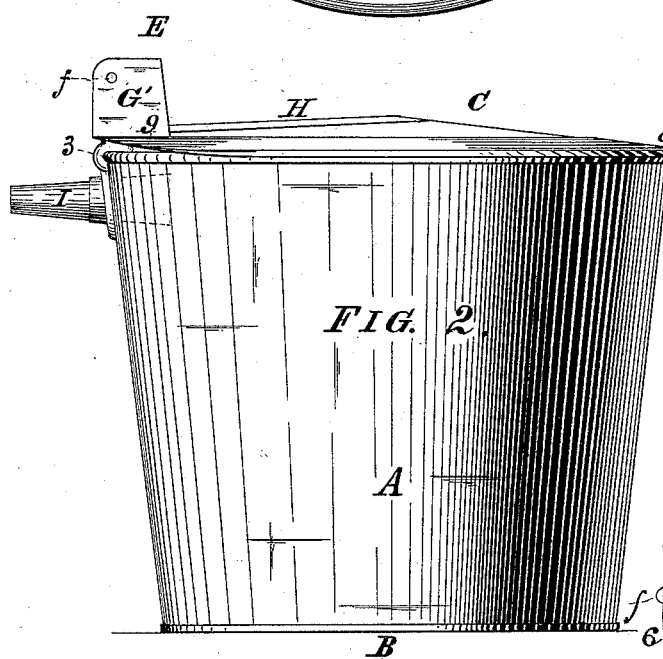
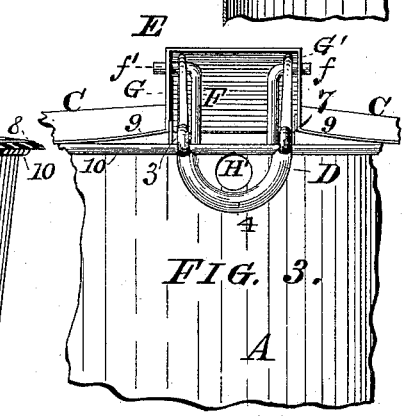
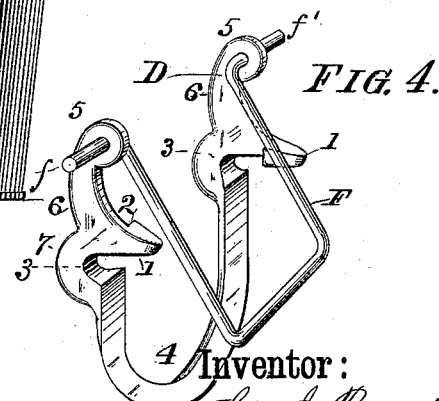
Witnesses:
Wm O Stark
Centie S. Stark
Inventor:
Geo. J. Record,
by Michael J. Stark,
Attorney.

UNITED STATES PATENT OFFICE.

GEORGE J. RECORD, OF CONNEAUT, OHIO.

REMOVABLE HINGE AND COVER FOR SAP-PAILS.

SPECIFICATION forming part of Letters Patent No. 417,281, dated December 17, 1889.

Application filed March 27, 1889. Serial No. 304,942. (No model.)

*To all whom it may concern:*

Be it known that I, GEORGE J. RECORD, of Conneaut, in the county of Ashtabula and State of Ohio, have invented certain new and useful Improvements on Removable Hinges and Covers for Sap-Pails; and I do hereby declare that the following description of my said invention, taken in connection with the accompanying sheet of drawings, forms a full, clear, and exact specification, which will enable others skilled in the art to which it appertains to make and use the same.

This invention has general reference to removable hinges and covers for sap-pails; and it consists, essentially, in the novel and peculiar combination of parts and details of construction, as hereinafter first fully set forth and described, and then pointed out in the claims.

In the drawings already mentioned, which serve to illustrate my said invention more fully, Figure 1 is a plan of my improved hinge and cover. Fig. 2 is a side elevation of a sap pail or bucket having my removable hinge and cover attached. Fig. 3 is an end elevation of a portion of the same detached. Fig. 4 is a perspective view of the hinge detached. Fig. 5 is a sectional elevation in line $x\ x$ of Fig. 1.

Like parts are designated by corresponding letters of reference in all the figures.

The object of my present invention is the production of an efficient device for removably attaching the hinges and covers of sap-pails one to the other. To accomplish this result, I construct a sap-pail A, having a bottom attached to its lower end by a double or seam B and a cover C, the latter being provided with a removable hinge D, the construction of which will hereinafter be referred to. To the top of this cover, and close to the edge thereof, I affix a hood or canopy E, the side walls G G' of which are perforated for the passage of pivots $f\ f'$ of a U-shaped clamping-yoke F, upon which pivots said cover swings in an obvious manner. To stiffen this cover, I provide the same with a V-shaped rise or projection H, which may, however, be of any other contour or configuration. The edge of the cover C is downwardly turned at 8, except for a short distance on each side of the hood E, where said edge is upwardly turned, the latter for the purpose of preventing water running off that portion of the cover into the pail and the former to provide means for deflecting the water away from the pail.

The hinge D is of substantially U shape, having bows or arches 7 in each of its parallel members 6, and notches 3 engaging the wired edge 10 of the pail to keep the hinge in an erect position, and at a suitable distance above these bows eyes 5, perforated for the passage of the pivots $f\ f'$, already mentioned. The members 6 have projections 1, provided with shoulders 2, as clearly shown in Fig. 4. The U-shaped clamping-piece F is made of wire having some spring temper, so that by pressing upon the parallel members they may be contracted and the pivots $f\ f'$ brought nearer to each other to allow the cover being passed over said pivots $f\ f'$, after which they will resume their normal position, as shown in the drawings. These pivots $f\ f'$ are made long enough so that by pressing on their ends the U-shaped wire frame F is unlatched from the shoulders 2, allowing the cover and hinge to be removed from the bucket. To attach this hinge to the bucket, the U-shaped clamp F is placed in position, as shown in Fig. 4, when the notches 3 of the bows 7 will engage the wired bead or edge 10 of the pail, it being placed so that the hole H' in the side of the bucket will be inside of the bow 4 of the hanger D. Now, the clamp F is pushed toward the hanger, so as to snap behind the shouldered projections 2, when the hinge will be clamped and securely locked in position, the cover having previously been affixed to the pivots $f\ f'$ in manner already explained.

The advantages of the device, as heretofore described, consist in the readiness with which the cover may be attached and detached in an instant of time without disturbing the pail, while at the same time the wind or stormy weather cannot remove the cover or disarrange the same. This is quite a feature in sap-pails, where the loss of the cover in stormy weather invariably results in the loss of the sap contained in the pail. It also facilitates the removal of ice that forms in the pails at various times during the sugar-making season.

The hinge allows of the emptying of the pail without raising the cover. It swings around the pivots $f\,f'$ while the pail is being revolved around the sap-spout I, Fig. 2, the latter forming a pivot for said pail. It also closes again automatically (by gravitation) when the pail is returned to its normal position. This mode of operation prevents the snap from being blown away, as is the case when the bucket is set on the ground, and obviates the necessity of setting down the gathering-pail usually employed in the collection of the sap and unhooking the bucket, thereby saving time, trouble, and other annoyances.

The hinge and cover may be readily manufactured at a small cost in tin and malleable iron, the clamp F being made of wire, and they are applicable to pails of all kinds without change or modification.

It will be readily observed that, the hinge being removably affixed to the cover and the latter also removably attached to the hinge, these parts may be readily attached to or removed one from the other for cleaning and other obvious purposes.

The object of the hood above the cover is, primarily, to carry the pivots $f\,f'$, upon which the cover swings, high enough above the same so as to easily reach the same with the fingers when compressing the same to disengage the U-shaped wire clamping-yoke F from the projections 2 on the hinge-body D. It is, furthermore, carried up so high in order to allow of the introduction of a sufficient length of wire in said clamping-yoke to enable it to regain its normal shape, which it might not do were the wire shorter, and its elasticity therefore insufficient to enable it to assume its original shape after compression. Its purpose is, lastly, to receive a sap-spout in cases where a separate hanger (not shown) is used in connection with the pail, which hanger, however, is no part of my present invention.

Having thus fully described my invention, I claim as new and desire to secure to me by Letters Patent of the United States—

1. As an improved article of manufacture, a removable hinge for pails, consisting of a U-shaped body D, lugs on this body having shouldered projections, and a U-shaped clamp pivoted to said body and removably held thereto by the shouldered projections, as and for the purpose set forth.

2. The improved hinge for covers of pails hereinbefore described, consisting of a U-shaped body-piece having eyes on its upper end and being provided with projecting lugs having shoulders, as described, and the U-shaped clamping-piece having pivots engaging the eyes of said body-piece, the clamping-piece being locked to the body-piece by the shouldered projections, as and for the purpose stated.

3. The combination, with the bucket A, having the wired or beaded edge 10, of the hinge D, having notches 3, lugs 6, with eyes 5, projections 1, with shoulders 2, and the U-shaped clamp F, provided with the pivots $f\,f'$, the whole being constructed and combined in the manner as and for the purpose set forth.

4. In a sap-pail, the combination, with the pail having a wired edge, of a U-shaped body-piece provided with notches engaging the wired edge of said pail and with projections having shoulders thereon, and a clamping-piece pivoted to the body-piece and engaging the shouldered projections, as stated.

5. In sap-pails, the combination, with the cover, of a hinge consisting of a body-piece provided with shouldered projections and a clamping-piece pivoted to said body-piece and provided with laterally-projecting pivots engaging said cover, whereby by compressing said spring-clamp the cover may be removed from the hinge, as and for the object stated.

In testimony that I claim the foregoing as my invention I have hereto set my hand in the presence of two subscribing witnesses.

GEO. J. RECORD.

Attest:
FRED S. DICKINSON,
L. C. ATWOOD.